April 6, 1948.  W. B. KLEMPERER ET AL  2,439,365

COMPUTER

Filed Feb. 15, 1943  2 Sheets-Sheet 1

Wolfgang B. Klemperer
Everett H. Pier
INVENTORS

BY Edwin Coates
ATTORNEY

April 6, 1948.  W. B. KLEMPERER ET AL  2,439,365
COMPUTER
Filed Feb. 15, 1943  2 Sheets-Sheet 2

Wolfgang B. Klemperer
Everett H. Pier
INVENTORS

BY Edwin Coates
ATTORNEY

Patented Apr. 6, 1948

2,439,365

UNITED STATES PATENT OFFICE 2,439,365

COMPUTER

Wolfgang B. Klemperer, Los Angeles, and Everett H. Pier, West Los Angeles, Calif., assignors to Douglas Aircraft Company, Inc., Santa Monica, Calif.

Application February 15, 1943, Serial No. 476,030

10 Claims. (Cl. 235—61)

This invention relates to electrical computers and particularly to electrical computers for evaluating components of symmetric two-space tensors of second order or to evaluate vectorial properties possessed by a set of correlated quantities. Such a machine has applications to the solution of calculating problems arising in conjunction with measurements of essentially conservative phenomena of an electric, magnetic, elastic, hydrodynamic, and other physical nature encountered in scientific investigations and engineering exploits.

It is one object of the invention to provide an electric computer of this character above described which is compact, portable, inexpensive, foolproof, and rapid in action so that it may be accurately and rapidly operated by personnel relatively untrained in technical and mathematical fields.

It is another object of the invention to provide an electrical computer for determining certain unknown vectorially related quantities from at least three known directionally related quantities, the directions of which are angularly spaced at equal fractional intervals of a circle and the linear values of which have a definite relation to these unknown values, as for instance from the known tensile and/or compressive strains existent at a locus in a structural member, measured in three or more directions at equal angular intervals of 180° which have a definite mathematical relation to the unknown tensorially related shear strain in the member. The computer is capable of determining the shear strain or stress with reference to any direction, the direction of the principal axes, and the maximum and minimum shear strain or stress and the direction thereof.

It is still another object of the invention to provide an electric computer capable of fulfilling the above objects by the use of inductive rotary transformer means suitably arranged and associated with certain other electrical devices and in certain circuits.

The term "inductive rotary transformer" is used in the following description and claims to mean a transformer comprising a primary winding or coil and a secondary winding or coil, which are so movably adjustable with respect to each other that their axes may be relatively angled through a range of at least 180° embracing a condition of parallelism and angles deviating from parallelism, the center points of the two windings being so spatially related that the transformation ratio varies as the cosine of the angle between the coil axes.

While the particular embodiment of the invention herein described is a machine adapted for use in the evaluation of data obtained at directions which are angularly spaced at equal fractional parts of a half-circle, the invention in some of its broader features may be embodied in a machine for evaluating a plurality of vectors at equal or unequal angular spacings, or in determining a component of a vector in any direction.

Experimental exploration of the stress flow through stress-carrying thin-walled structures is becoming increasingly helpful in developing and proving the stress analysis of metal airplanes where accurate understanding of stress distribution is a prerequisite for safe and efficient design. On the surface of any integrally formed structural element the strain tensor is fully described by the "strain circle," or by the magnitude and orientation of the two principal linear strains. To determine the strain state experimentally, it is necessary and sufficient to measure the linear strain in three different directions on the surface element.

The conventional technique consists in applying, as described later, three linear strain gauges as closely packed as feasible or a single instrument designed to measure the distortion of a base triangle. The individual strain gauges may be of any suitable conventional design. Most recently, the development of reliable, compact, simple and inexpensive electrical resistance strain gauges together with improvements of indicators and recorders of consistent amplification has greatly enhanced the application of great numbers of strain gauges in inaccessible places on structures undergoing elaborate tests. Hundreds of "delta" triplets of resistors are readily cemented along spar webs, gussets, bulkheads, skins and other sheet metal plate, shell or frame structures.

However, a new bottleneck has originated with the very abundance of experimental data now within such easy grasp, namely that of evaluating the strain gauge measurements in terms of shear flow; i. e. of determining the direction and magnitude of maximum shear strain or the amount of shear with respect to any particular axis. Various methods have been proposed to facilitate this evaluation procedure for arrays of strain gauge rosettes with the individual gauges applied either at 0°–45°–90°–135° in "fan" fashion or at 0°–60°–120° in "delta" fashion.

They are based either on a trigonometrical routine or on a graphical construction or on the manipulation of a mechanical nomogram device. But all these methods are either tedious or exacting. With several hundred gauge stations and half a dozen load stations in any one test there are several hundred man-hours of engineering labor required for the evaluation of data.

In order to facilitate and expedite the work of evaluating such strain gauge measurements, this invention was conceived and developed. It is designed to solve the strain problem after the manner of a computer into which the measured linear strain component values are fed as input and from which the orientation of the principal strain axes and the maximum shear or, optionally, the shear component in any desired direction, can be derived as output. The machine is compact and portable. It may be operated by anyone without technical training in a fraction of the time required by any longhand method of computation.

In the drawings, which are for illustrative purposes only;

Figure 1:
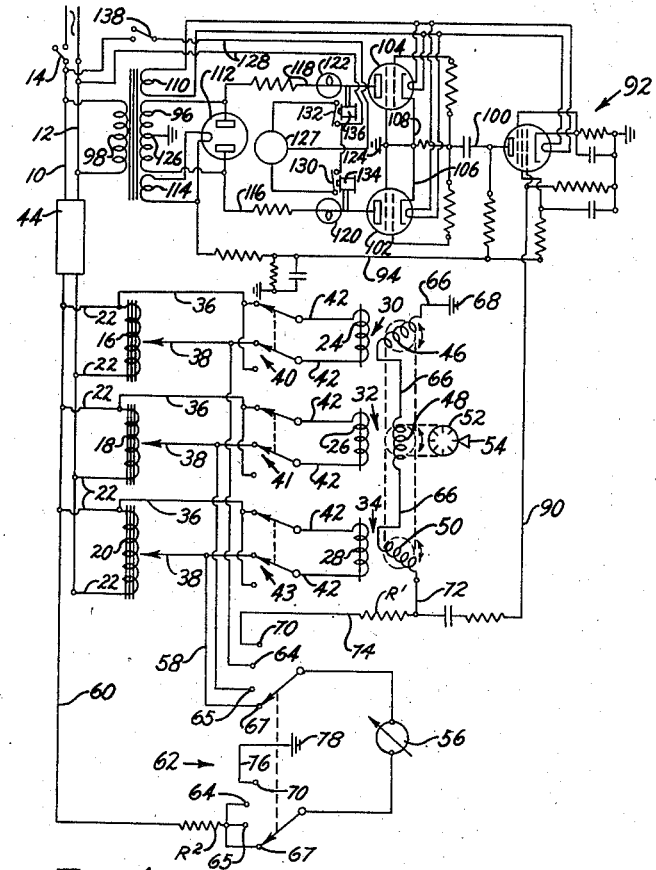
Figure 1 is a wiring diagram of a machine constructed in accordance with this invention.
Figure 2:
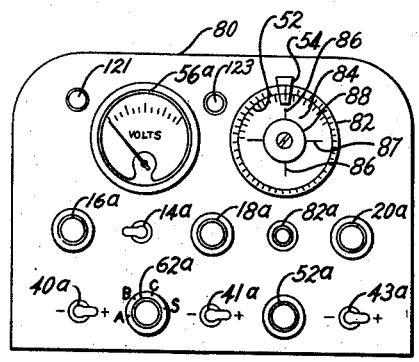
Figure 2 is a front elevation of the machine of Figure 1.

The machine shown in Figures 1 and 2 is designed for the evaluation of linear strain measurements taken in rosette fashion on the surface of a structural element carrying tension and/or compression and shear.

Figure 4:
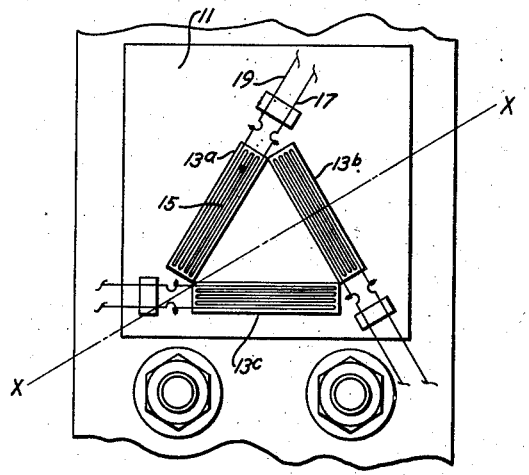
Figure 4 is a view showing a delta array of three strain gauges in operative position upon a structural member.

Figure 4 shows such a structural element 11 to the face of which are adhesively secured three strain gauges 13 differentially designated by the suffixes $a$, $b$, and $c$. The three gauges are arranged as closely together as possible in the form of a delta each gauge forming angles at 60° with the other two gauges at its two ends respectively. Considering the direction of gauge 13$^a$ as a reference direction, the orientation angles in a clockwise sense of gauge 13$^a$ is 0°, of gauge 13$^b$ is 120° and of 13$^c$ is 60°. With reference to axis $x$—$x$, and in a clockwise sense, the angle of angle 13$^a$ is 150°, of 13$^b$ is 90° and of 13$^c$ is 30°.

Each gauge is here shown as a grid 15 of fine resistance wire held in place adhesively between two strips of thin paper, the grid having terminals 17, 19 which are connected to a suitable meter (not shown). The gauges are adhesively secured to the structural member 11 when the latter is free from stress and strain. Upon the application of stresses to the member 11, the grids of the several gauges are elongated or shortened in accordance with the direction and value of the stresses.

Elongation of a grid increases its electric resistance directly as the elongation, an increase which is readily measured in a known manner. The readings of the meter for the three gauges are the data for the solution of the complete local state of strain. The strains in the gauges 13$^a$, 13$^b$, 13$^c$ may be designated by the characters $a$, $b$, and $c$.

The values principally desired are not necessarily the linear strains or stresses in the orientation in which they are measured but the shear strains and stresses and their orientation. The computer is therefore constructed to determine the shear strain and stress in any direction and the value and orientation of the maximum shear stress from the value of the three linear strains as disclosed by the three strain gauges.

The solution of this evaluation problem is accomplished by means of coupled rotary transformers, each of which corresponds to one of the rosette gauges. The output of the instrument furnishes directly the maximum shear and the orientation of the principal strain axes with respect to the rosette axes as well as the shear component with respect to any desired axis.

Referring to Figure 1 of the drawings, the machine is supplied with electric current by feeders 10, 12 from a suitable source of single phase alternating current of preferably any standard service frequency. A master switch 14 controls the supply of current to the machine.

Three variacs 16, 18, and 20 are connected in parallel across the feeders 10 and 12 by conductors 22. The three primary windings 24, 26, and 28 of the three inductive rotary transformers 30, 32, and 34 are connected respectively to the three variacs 16, 18, and 20 by conductors 36 and 38, polarity reversing switches 40, 41, and 43, and conductors 42 as shown. Conductors 38 movably engage the coils of the variacs, enabling the input voltages to the primary windings 24, 26, and 28 to be independently regulated. The voltage input to the variacs is controlled by the voltage regulator 44.

Three secondary windings 46, 48, and 50 of the inductive rotary transformers 30, 32, and 34 are inductively related respectively to the primary windings thereof, 24, 26, and 28. The coupling angles of the three transformers are permanently geometrically related to each other in such a manner that the angular intervals between these coupling angles are equal fractional parts of 360°, viz. 120° each. All three coupling angles may, however, be varied in unison by equal amounts of any desired magnitude. This result is accomplished by rotatably mounting the secondary windings 46, 48, and 50 to rotate in either direction as indicated by the double pointed arrows on the drawing and by fixedly mounting them on the same rotatable shaft or by otherwise mechanically connecting them to rotate in unison on a one to one ratio, as by gearing. The primaries 24, 26, and 28 are stationary. The latter may then be called stators, and the secondaries may be termed rotors. The rotative movement required of the rotors in the operation of the computer is not, however, an around the clock continuous movement, but a movement of adjustment over an arcuate fraction of the circle, manually accomplished at successive junctures in the course of the operation of the machine.

A dial wheel 52 connected to turn in a one to one ratio with the rotors and a fixed pointer 54 serve to determine the orientation of the rotors with respect to the stators. In the drawing, rotor 48 is shown making an angle of 0° or 180° with stator 26 depending upon which end of the rotor is taken for reference. If the lower ends of the primary and secondary windings be taken for reference, the angle is 0°. Similarly rotor 46 makes an angle of 240° with stator 24 and rotor 50 makes an angle of 120° with stator 28. These angles 0°, 120°, and 240° are spaced at 120° intervals which are equal fractional parts of 360°.

The voltage input to each primary may be adjustably regulated by the corresponding one of the variacs 16, 18, and 20. The three different adjusted potential across the terminals of the primaries are then modified when inductively transferred to the secondaries by factors which, as the windings are positioned in the drawings, are proportional to the cosines of 120°, 0° and −120°, i. e. −.5, 1 and −.5 respectively.

The secondary windings are electrically connected in series by conductors 66, one end of this grounded circuit being grounded at 68.

The voltmeter 56 may be selectively connected between any one of the conductors 38 and feeder 10 for use in regulating the potentials impressed upon the transformer primaries through conductors 58 and 60 by throwing selector switch 62 to the corresponding one of the contact points 64, 65, and 67. It may also be used to measure the voltage of the series connected secondaries by throwing the switch 62 to contact points 70 to connect conductor 72 at one end of the series connected secondaries through conductors 74 and 76 to ground at 78.

The polarity of the potential in the circuit of the series connected secondaries relative to the source potential is indicated as follows. The series circuit current flows through conductor 90 to amplifier 92. The amplifier 92 is supplied with direct current over conductor 94 from a rectifier tube 112 which is connected to a secondary coil 96 inductively coupled to a primary 98 connected across the feeders 10 and 12. The amplified current flows through conductor 100, and thence to the grids of thyratron tubes 102 and 104 over conductors 106 and 108 respectively. The filaments of these tubes and of the amplifier tube are heated from a secondary coil 110. The rectifier tube filament is heated from a secondary coil 114.

The secondary 96 has a grounded center point 126 and its alternating potential is impressed upon the plates of the thyratron tubes 102 and 104 by conductors 116 and 118 respectively along which are placed polarity indicator lamps 120 and 122 of different colored bulbs.

If the rotor series current is of the same sign or phase as the source current, then at a juncture when current from the amplifier is positive and current in the feeders 10 and 12 is also positive, positive current will flow from secondary 96 along conductor 116, illuminating lamp 120, thence through thyratron 102 to its cathode and thence to ground 124, returning to centerpoint ground 126 to coil 96. The negative potential in conductor 118 will prevent a current flow across thyratron tube 104 when the grid thereof is at positive potential.

If the rotor series current is of the opposite sign as the source current, at a juncture when current from the amplifier is positive, positive current will flow through lamp 122 and thyratron tube 104 because the grid of that tube is of a positive potential and the negative potential on the plate of thyratron tube 102 will prevent current passing through that tube when its grid is positively charged. Since at junctures of the current alternation when the grids are negatively charged the thyratron tubes are inactive in any event, it is evident that lamp 120 will receive a half wave lighting current when the rotor series circuit current and source current are of the same sign and lamp 122 will be similarly lighted when the currents are of opposite sign.

If desired, a reversible servo-motor 127 may be geared to drive the shaft of the rotors which turns the dial 52, and this motor may be electrically connected to the source current by conductors 128 through reversing relay switches 130 and 132 controlled by relay coils 134 and 136 in the conductors 116 and 118 respectively. This servo-motor will then automatically find the direction of the axis of zero summation. A switch 138 controls the supply of current to the servo-motor.

Figure 2 is a front elevation of the control panel 80 of the computer. The voltmeter 56 of Figure 1 has an indicating dial 56ª on the panel 80. The three polarity switches 40, 41 and 43 have for their manipulation three handles 40ª, 41ª and 43ª respectively. The master switch 14 is operated by a handle 14ª. The variacs 16, 18, and 20 are operated by knobs 16ª, 18ª, and 20ª respectively. The lamps 120, 122 are visible through windows 121, 123 respectively. The switch 62 is manipulated by a knob 62ª to positions A, B, C, and S corresponding to contacts 64, 65, 67, and 70 respectively. The dial 52 and pointer 54 shown in Figure 1 are also shown in Figure 2. Dial 52 is encircled by a concentric dial 82. Dial 52 is rotated by knob 52ª and dial 82 by knob 82ª. A transparent dial 84 having index lines 86 and 87 at right angles indicated thereon is frictionally secured to and rotatable with dial 52 and may be rotated with respect thereto by a knob 88. The dials 52 and 82 are graduated to read one half the actual angle of rotor rotation, the complete circle of the dial being graduated to 180 degrees.

The procedure of operating the machine for a 60° delta set of three linear strain gauge readings from strain gauges applied to a structural member subjected to stresses producing a maximum shear stress in one direction and a zero shear stress at an angle of 45° thereto is as follows:

As an example assume three strains at 60° spacing were measured in a test and found to be $a=14.0$, $b=11.3$, $c=-7.5 \times 10^{-4}$ strain units.

Now, turn selector switch knob 62ª to A, adjust the variac 16 so that the indicator 56ª reads 14.0; turn selector switch 62ª to B, adjust the variac 18 so that indicator 56ª reads 11.3; turn selector switch knob 62ª to C, snap polarity switch 43 to minus, adjust variac 20 so that indicator 56ª reads 7.5; now turn the selector switch knob 62ª to S and rotate the rotor knob 52ª until the indicator 56ª reads a maximum. This maximum is the shear amplitude which is equal to the maximum shear strain value, in this example $13.6 \times 10^{-4}$, and the index 54 on the dial scale now reads the orientation of the principal or maximum strain angle against the A leg in a conventional sense (in the case of the example 27°). The positive lamp 120 will light, indicating that the 13.6 reading of the indicator 52ª is a plus value. This entire operation takes less than 30 seconds.

If great accuracy in determining the orientation of the maximum shear axis is desired and warranted, the dial knob 52ª may be turned to zero output as read on indicator 56ª which should occur according to the laws of stress and strain at an angle of 90° of the rotors or 45° in the strain field from the maximum strain as indicated on dial 82. This can be readily checked with the aid of the lines 86 and 87 on the adjustable dial 84. If all three input values are adjusted to equal values then the lamps will flicker alternatingly to indicate that there is no solution for the angle. If the servo-motor circuit relied on to bring the rotors automatically to the position of zero shear strain, the switch 138 will be snapped on during this phase of the computation and snapped off upon its completion to free the servo-motor 127 and the rotors 30, 32, and 34 for manual rotation.

For the convenience of utilizing the meter 56 at a pair part of its range, its dial 56ª is provided with three scales in the ratio ½:1:2. Any one of these scales may be used for each problem, but consistently the same for all input adjustments and for the output reading. The scale giving the largest meter deflection affords the greatest accuracy for the evaluation.

If the linear strain at some definite angle from the A gauge line is desired, then simply turn the knob 52ª to the corresponding dial angle and read the indicator 56ª with selector switch on S, and add this reading (with due regard to polarity) to the average linear strain $(a+b+c)/3$.

Letting $\delta$=shear strain amplitude; $\epsilon$=average linear (+tensile or −compressive) strain; $\epsilon_p$=maximum linear strain and $\epsilon_q$=minimum linear strain, the maximum or minimum linear strains are readily found by adding or subtracting the shear amplitude $\delta$ to or from the average linear strain: $\epsilon_p = \epsilon + \delta$ and $\epsilon_q = \epsilon - \delta$.

The principal stresses $s_p$ and $s_q$ are determined from the principal strains $\epsilon_p$ and $\epsilon_q$ by introducing the elastic modulus E and Poisson's ratio according to $$s_p = \frac{E}{1-\gamma^2}(\epsilon_p + \gamma \epsilon_q) \text{ and } s_q = \frac{E}{1-\gamma^2}(\epsilon_q + \gamma \epsilon_p)$$

and the maximum shear stress according to $$\tau_{max} = \tfrac{1}{2}(s_p - s_q) = \frac{\tfrac{1}{2}E}{1+\gamma}(\epsilon_p - \epsilon_q) = \frac{E}{1+\gamma} = 2G\delta$$

where $G = E/2(1+\gamma)$ is the shear modulus which is a known material constant.

The theory underlying the instrument as to the mathematical relation of input and output values is based on the fact that by virtue of the symmetry of the strain tensor, the strain can be represented by a vector in a polar coordinate field in which the phase angle is twice the strain orientation angle measured from a reference linear strain axis. From this it follows that the linear strain in any direction defined by an angle $\tfrac{1}{2}\theta$ from the axis of maximum shear strain can be expressed by the relation (1) $\qquad \epsilon\theta/2 = \epsilon + \delta \cos\theta$ where $\epsilon$ is the average linear strain and $\delta$ the linear strain amplitude which is half the difference between maximum and minimum linear strain and numerically equal to the maximum shear strain since by the laws of elasticity the linear strain amplitude is equal to the shear strain amplitude. The average linear strain $\epsilon$ is immediately determined as the arithmetical average of the 3 linear strain components $\epsilon_a$, $\epsilon_b$, and $\epsilon_c$, measured at three directions 60° from each other (or for that matter, of any number of strain gauge readings taken at regular subdivisions of 180°). It is the values of the linear or shear strain amplitude $\delta$ and of the orientation angle $\theta$ which are determined by the machine.

From the description of the construction, operation and circuit of the "delta" triplet type of instrument it will be evident that the voltage generated in each one of the 3 rotors 46, 48, and 50 is expressed by a time phase vector proportional to $\epsilon_a \cos\phi$, $\epsilon_b \cos(\phi+120)$, $\epsilon_c \cos(\phi-120)$ respectively, if $\phi$ is the incidental angle at which the magnetic axis of the A rotor happens to be set with respect to its stator coil axis. If now the various measured linear strain values are really regularly spaced components built of the terms defined by Equation 1, then $$\epsilon_a = \epsilon + \delta \cos\theta$$
$$\epsilon_b = \epsilon + \delta \cos(\theta+120)$$
$$\epsilon_c = \epsilon + \delta \cos(\theta-120)$$

and thus the sum S of the voltages generated by all rotors in series, as they are all electrically in phase being derived from the same primary alternating current source, is the sum of the following three lines:

$$\epsilon_a \cos\phi = \epsilon \cos\phi + \delta \cos\phi \cos\theta$$
$$+\epsilon_b \cos(\phi+120) = +\epsilon \cos(\phi+120) + \delta \cos(\phi+120)\cos(\theta+120)$$
$$+\epsilon_c \cos(\phi-120) = +\epsilon \cos(\phi-120) + \delta \cos(\phi-120)\cos(\theta-120)$$

$$S = 3/2\, \delta (\cos\phi - \theta)$$

This proves that for $\phi = \theta$ the value of S becomes a maximum and that it varies as a cosine function of the departure of the phase angle from this principal axis. The quantity of S is exactly 3/2 times that of the unknown shear and linear strain amplitude $\delta$. The reciprocal of this peculiar factor, namely the factor 2/3 by which S must be multiplied to obtain $\delta$, is built into the machine in the form of a resistance $R^1$ (Figure 1) connected when the selector switch is in the S position, so that the true value of $\delta$ can be read directly on the same scale of the milliammeter indicator as the values $\epsilon_a$, $\epsilon_b$, $\epsilon_c$, to which the inputs had been adjusted. The resistance $R^1$ is so related to the resistance $R^2$ in the return conductor from the meter circuits for the three primaries that the meter automatically takes care of this 2/3 factor.

If a "fan" type rosette quadruplet of gauges placed at 0°, 45°, 90° and 135° from a reference line is used to obtain data instead of the three gauge rosette described above, a machine similar to the one described above is used to compute the same desired values, in which there are four inductive rotary transformers having their rotors at 90° phase intervals. In such a machine the meter circuits are designed to cause the meter to read ½ the true voltage of the series circuit.

The following proof demonstrates the reason for using the factor ½ in the evaluation of a quadruplet array of gauges instead of the factor 2/3 in a delta array, by a similar machine having four rotors at 90° phase difference to represent the "fan" type rosette quadruplet of gauges placed at 0°-45°-90° and 135° from a reference line.

Here it is presumed that the four strain values really are consistent with $$\epsilon_a = \epsilon + \delta \cos\theta$$
$$\epsilon_b = \epsilon - \delta \sin\theta$$
$$\epsilon_c = \epsilon - \delta \cos\theta$$
$$\epsilon_d = \epsilon + \delta \sin\theta$$

With these values set into the computer, the sum of the voltages generated in the rotor circuit is $$\epsilon_a \cos\phi = \epsilon \cos\phi + \delta \cos\phi \cos\theta$$
$$-\epsilon_b \sin\phi = -\epsilon \sin\phi + \delta \sin\phi \sin\theta$$
$$-\epsilon_c \cos\phi = -\epsilon \cos\phi + \delta \cos\phi \cos\theta$$
$$+\epsilon_d \sin\phi = +\epsilon \sin\phi + \delta \sin\phi \sin\theta$$

$$S = 2\delta(\cos\phi\cos\theta + \sin\phi\sin\theta) = 2\delta\cos(\phi-\theta)$$

This again proves that if $\phi=\theta$, S becomes a maximum and for this angle indicates the principal axes. Thus the factor here is ½ rather than ⅔.

Now it may be noted that four strain gauges actually furnish a redundant set of data. If afflicted with some small errors they would not be compatible with the four equations of but three unknown quantities. In order to be compatible with all four equations, alternating pairs of mutually perpendicular strains would have to add up to identical sums, viz:

$$\epsilon a + \epsilon c = \epsilon b + \epsilon d$$

If they do not, their cross sums may differ by a discrepancy $e = \epsilon a + \epsilon c - \epsilon b - \epsilon d$. The machine, if operated without any regard to this discrepancy, will yield the same solution as if the individual strain values had each been corrected by one quarter of the discrepancy, subtracted from those whose cross sum was long and added to those whose cross sum was short. This is readily seen when adding ¼$e \cos \phi$, ¼$e \sin \phi$, $-¼e \cos \phi$ and $-¼e \sin \phi$ respectively, to the four equations above which were added to obtain the equation for S. Their sum indeed cancels, thus splitting the error in a logical way, assuming all measurements were of equal accuracy. Some experimenters prefer the redundant quadruplet method to the determinate delta because of the clue to the accuracy of the measurements afforded by the discrepancy $e$.

If more than four gauge readings or more than four similar datum quantities of similar nature, uniformly spaced, are used, it will be found in solving the corresponding equations that the factor is as before always twice the reciprocal of the number of the datum quantities.

Figure 3:
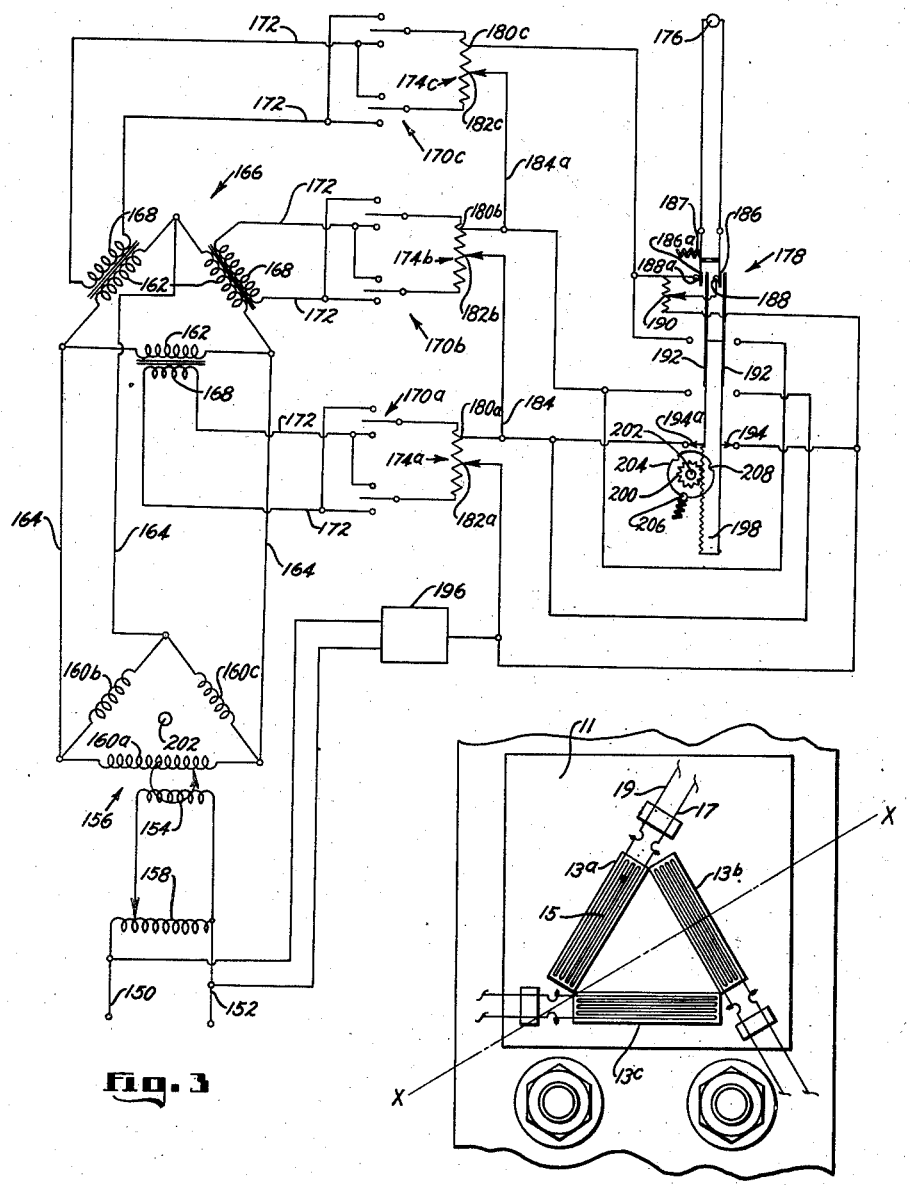
Figure 3 is a wiring diagram of a machine embodying the invention in another form.

Figure 3 is a wiring diagram of an alternate form of the invention.

Single phase alternating current from a suitable source in the conductors 150, 152 is supplied to a stationary primary winding 154 of an inductive rotary transformer means 156 through a variac 158 by which the voltage input to the primary may be controlled. The secondary winding means of the transformer means 156 comprises three secondary series connected windings 160$^a$, 160$^b$, and 160$^c$ rigidly related to each other at 60° angles and rotatable as a whole to selectively dispose any one of the three secondaries parallel to or at any other angle to the primary winding 154.

Another similar but stationary assembly of three windings 162 connected in an endless series which have their junction terminals connected to the corresponding junction terminals of the secondary windings 160 by conductors 164, form the primary of a transformer means 166. The three stationary secondary coils 168 of the transformer means are connected by conductors 172 through reversing switches 170$^a$, 170$^b$, and 170$^c$ to the potentiometers 174$^a$, 174$^b$, and 174$^c$.

A vacuum tube voltmeter 176 is connected selectively by the switch device 178 between one of the fixed contacts 180$^a$, 180$^b$, and 180$^c$ and the corresponding one of the movable contacts 182$^a$, 182$^b$, and 182$^c$ of the potentiometers 174. The voltmeter 176 is also connectible between movable contact 182$^a$ and fixed contact 180$^c$ through switch device 178, the measure of the potential between these points being secured by reason of the cross conductors 184, 184$^a$ connecting the fixed contacts 180$^a$ and 180$^b$ with the movable contacts 182$^b$ and 182$^c$ respectively.

The switch arms 186, 186$^a$ are normally held in contact by tension spring 187 with the terminals 188, 188$^a$ leading to the contacts 182$^a$ and 180$^c$, the terminal 188 having a sliding connection with the resistance 190 which is interposed between the conductors leading to contacts 180$^c$ and 182$^a$.

When the switch arms 186 and 186$^a$ are held down in contact with the switch conductor slide bars 192 the switch terminals 194, 194$^a$ may be slid selectively into contact with terminals leading to any one of the resistances 174 to connect the voltmeter 176. An amplifier and polarity indicator is represented at 196. It is like that already described in connection with the first described form of the invention.

The switch conductor slide bars 192 are insulatedly mounted on a rack bar 198 which meshes with a pinion 200 on the shaft 202 of the rotatable secondaries 160. A disk 204 also mounted on this shaft has three notches 208 into which may be received a spring pressed detent 206. The notches 208 are spaced to hold each of the secondaries parallel to the primary 154 when the switch terminals 194, 194$^a$ are in contact with the terminals connected to the corresponding potentiometer 174.

In the operation of the computer in this form, the secondaries 160 are rotated to successively dispose them parallel with the primary 154; as each secondary is parallel to the primary, the switch device 178 will connect the voltmeter 176 across the terminals 180 and 182 corresponding to the secondary. The movable contact 182 is then adjusted to secure on the voltmeter dial a reading agreeing with the linear value of the corresponding datum quantity entering into the computations.

The corresponding polarity switch 170 is also placed in proper position. The switch arms 186, 186$^a$ are then released giving the geometrical sum of the datum quantities for the angular position in which the secondaries 160 happen to be placed. By rotating the secondaries the sum for any angular position may be computed, and the maximum and minimum values and the orientation of their axes may be obtained as before.

The resistance 190 may be adjusted to properly relaate the readings of the voltmeter of the linear values and their sum on a one to one basis or to incorporate any desired factor in the computations.

Both forms 1 and 2 of the invention described herein have certain features in common. The two terminals of each rotor winding in form 1 and of each potentiometer in form 2 comprise a pair of conductors defining a conductor span therebetween. Each conductor span is bridged by an impendance means (the rotor winding in one case and resistance element in the other) which permits current flow to and from the conductors. This impedance means may be a condenser. And the source circuit may supply direct current, in which case the impedance means takes the form of resistance and the trigonometric functional curve of relationship of potential may be secured by a rotating controller arm of variable length for each datum quantity, the contact at its outer end engaging tangentially arranged rheostat buttons.

A machine of this invention is capable of determining the value and orientation of the maximum linear strain, and the linear strain at any radial position at the surface of a cylindrical beam or one of regular polygonal cross section subjected to longitudinally acting linear stresses and to bending stresses. The linear strain is measured, as by strain gauges of the type herein described, placed longitudinally of the beam at three or more surface positions spaced at equal angular intervals of its circumference at one station longitudinally of the beam.

The machine for computing these values will have transformer rotors equal in number to the number of linear strain measurements and the dial will be marked to indicate 360° around its complete circumference. For the linear strain here varies in the manner of a sine curve for maximum to minimum and back to maximum in one complete revolution of the longitudinal axial plane wherein the surface strains are measured.

Many other modifications of the invention will occur to those versed in the electrical art. The invention includes all such modifications and is defined in the following claims.

We claim:

1. A computer for evaluating datum quantities having vectorial features, comprising: a source of alternating current; a plurality of conductor paths, said paths carrying currents of identical frequency and phase, branching off from said source; means for individually adjusting the potentials of said conductor paths to values proportional to the respective values of the datum quantities; inductive transformer means, the primaries of which respectively terminate the respective conductor paths, said transformer means including rotary secondaries having primary-coupling angles permanently arranged with respect to each other at equal parts of 360° and so operable as to concurrently modify the values of the secondary output potentials by factors related to each other as sine functions spaced at geometrical angles equal to the angular intervals of the directions of said vectorial features associated with said datum quantities; means for connecting said modified secondary potentials in a series circuit; and means for indicating the value of the potential across the outside terminals of said series circuit.

2. A computer for evaluating a set of at least three vectors having directions spaced at equal angular fractions of a complete circle, comprising: a plurality of conductor paths; means for impressing across said conductor paths alternating potentials of identical frequency and phase; means for independently adjusting the individual potentials to values proportional to the linear values, respectively, of the vectors; means for reversing the polarity of said individual potentials to agree with the sign of the corresponding vector; inductive transformer means, the primaries of which respectively terminate the respective conductor paths, said transformers including rotatable secondaries permanently fixed together at coupling angles to the primaries constituting equal parts of 360° and rotary together in such angular relationships to concurrently modify the values of said potentials by factors related to each other as sine functions geometrically offset to each other at spatial angular intervals which are constant and equal portions of 360°; means for connecting said modified potentials in series circuit; means for indicating the value of the potentials across the outside terminals of said series circuit; means for concurrently varying the modifying angular positions of all said secondaries together, the rotary transformer means being mechanically interconnected; and means for indicating the spatial angular position of said inductive rotary transformer means.

3. A computer for evaluating a set of at least three datum quantities associated with directional lines spaced at equal angular fractions of a complete circle, comprising: a source of alternating current of definite voltage and frequency pattern; means receiving currents of identical frequency pattern and phase from said source; means for individually adjusting the potentials of said means to values proportional to the respective linear values of the datum quantities; means for reversing the polarity of any one of said potentials independently of the other potentials to agree with the sign of the corresponding datum quantity; inductive transformer means, the primaries of which respectively terminate said current receiving means, said transformers including rotatable secondaries having primary-coupling angles permanently spaced from each other at equal parts of 360° and adjustable in unison in said angular relationship to concurrently modify the value of said potentials by factors related to each other as sine functions offset at geometrical angular intervals which are constant and equal portions of 360°; means for connecting said modified potentials in series circuit; means for indicating the polarity of said series circuit; means for varying the angular position of the inductive rotary transformer means, the rotary transformer means being mechanically interconnected; and means for indicating the spatial angular position of said inductive rotary transformer means.

4. A computer, comprising: at least three inductive transformer means, each having a static primary and a rotary secondary mounted in inductive relationship and mounted for gang adjustment in unison to vary their mutual inductivity proportionally to the sines of the angle of the rotor position with respect to the stator, said rotor secondaries being permanently so oriented with respect to each other that their respective rotational positions of neutral inductivity are permanently spaced at equal fractions of 360° of said rotor position, thereby to effect concurrent modification of the values of the potentials by factors related to each other as sine functions offset at geometrical angles equal to the angular intervals of the vectorial directions ascertainable by the computer from datum quantities; means to feed alternating current derived in identical phase and frequency, from a single source to the primary winding means of said transformer means; means to independently regulate the value and polarity of the voltage outputs of said several transformer means for any given angular position of each rotor; means to measure the value and polarity of the series sum of said output voltages for any given angular position of said mechanically connected rotor aggregate; and means to angularly measure the rotative position of said rotor aggregate.

5. In an electrical computer to evaluate data such as rosette strain gauge measurements, the combination of a circuit carrying single phase alternating current; at least three inductive rotary transformers each having a rotor and a stator in inductive relationship, said stator primaries being connected in parallel to said circuit, and said rotors and said stators being mutually mounted to vary their mutual inductivity proportional to the sine of the phase angle of the rotor rotation with respect to the stator, said rotors being mechanically connected to rotate in unison, the primaries and secondaries of said transformers being oriented to relate said secondaries at such rotative angles with the magnetic flux of their respective transformers as to effectively space said rotative angles an equal number of degrees apart; means to feed alternating current derived in phase from the same source to the primary windings of said transformers; means to individually regulate the voltage admitted to each primary winding; and means to measure the output voltage of all secondary windings in series.

6. In a computer, the combination of: a circuit carrying single phase alternating current; three inductive rotary transformers having stator primaries connected in parallel to said circuit and having series connected rotor secondaries mechanically connected so as to be equiangularly rotatable in unison, said primaries and secondaries being orientated to relate said secondaries at such rotative angles with the magnetic flux of their respective transformers as to effectively space said rotative angles 120 degrees apart; means for separately regulating the value of the electromotive force of each said primaries; means for measuring the value of the total electromotive force of said series connected secondaries; means for equiangularly rotating said secondaries in unison; and means for measuring the rotative position of said secondaries.

7. In a computer, the combination of: a supply circuit; a source of single phase alternating current connected to energize said supply circuit; a potentiometer for said supply circuit; three rotary transformers having stator primaries connected by parallel circuits to said supply circuit and having rotor secondaries connected in a series circuit, said rotor secondaries being mechanically connected for equiangular rotation in unison, said primaries and secondaries being orientated to relate the reluctance axis of said secondaries at such inductive coupling angles with the flux axis of their respective primaries as to effectively space said angles 120° apart; a variac for regulating the voltage of the electromotive force supplied each primary from said supply circuit; a polarity switch connected between said supply circuit and each said primary; means for separately measuring the potential of each primary circuit and of said rotor secondary series circuit; an amplifier connected to amplify the voltage in said secondary series circuit; a polarity indicator connected between said amplifier and said supply circuit; manually operated means for equiangularly rotating said secondaries in unison; and an indicator dial for measuring the angular position of inductive coupling of said secondaries.

8. The combination defined in claim 2 and in addition thereto: means responsive to the polarity of said series circuit for rotating said inductive rotary transformer means to reduce the potential of said series circuit to zero.

9. In a computer, the combination of: at least three transformers, the primary and the secondary of each transformer being relatively movably adjustable for varying the voltage output of the transformer in a sine curve relation to the range of said relative movement of adjustment; means mechanically linking the primaries and means mechanically linking the secondaries, to constantly space their respective portions of adjustment at equal fractional intervals of said movement of adjustment; means for impressing upon the primaries mutually in-phase alternating potentials, respectively; means for independently regulating the values of said potentials, respectively, said regulating means including a variac and a polarity switch interposed in the connection between said single phase alternating current circuit and said primaries; and means for measuring the output of all said secondaries in series, said measuring means comprising a meter arranged to be connected between the series terminals of said secondaries and a polarity indicator connected between said secondary circuit and said single phase alternating current circuit.

10. A computer for a plurality of datum quantities having vectorial features, comprising: a plurality of pairs of electrical conductors, equal in number to the number of datum quantities, each pair being bridged by impedance means; a source of electrical potential connected to said impedance means; a plurality of means for establishing individual electric potential across the two conductors of each of said pairs of conductors each adjustable to correspond to the linear value of a corresponding datum quantity; means for independently reversing the polarities of said potentials to agree with the signs of the corresponding datum quantities; inductive transformer means, the primaries of which respectively terminate the respective aforesaid pairs of electrical conductors, said transformers including rotor secondaries having primary coupling angles permanently fixed with respect to each other at equal parts of 360° and rotative to afford concurrent variations of the values of the potentials by factors related to each other as sine functions of geometrical angles offset at the angular intervals of the directions associated with said datum quantities, the rotor secondaries being ganged and adjustable in unison in said mutual angular relationships so as to vary geometrical angle between the rotor aggregate and the stators; means for indicating said geometrical angle; means for connecting the several secondaries in a series circuit; means for indicating the value of the potential across the outside terminals of said series circuit; and means for indicating the polarity of the potential of said series circuit.

WOLFGANG B. KLEMPERER.
EVERETT H. PIER.

REFERENCES CITED

The following references are of record in the file of this patent:

UNITED STATES PATENTS

| Number | Name | Date |
|---|---|---|
| 1,559,325 | Jewett | Oct. 27, 1925 |
| 1,799,134 | Hardy | Mar. 31, 1931 |

OTHER REFERENCES

Maxwell: "An electrical method for compounding sine functions"; page 47, R. S. I., vol. 11, No. 2, Feb. 1940. In P. O. library, Q184/R.454.

Schooley: "An electromechanical method for solving equations," RCA Review, July 1938; pages 86–96.

Herr and Graham: "An electrical algebraic equation solver," Review of Scientific Instruments, Oct. 1938, pages 310–315.